United States Patent [19]
Fuller

[11] Patent Number: 5,826,005
[45] Date of Patent: Oct. 20, 1998

[54] SYSTEM AND METHOD FOR DIAGNOSING COMPUTER PROGRAM FAULTS THROUGH THE PROVISION OF PROGRAM PROBE POINTS AND REFERENCEABLE DIAGNOSTIC PROGRAM PROBES

[75] Inventor: Billy J. Fuller, Colorado Springs, Colo.

[73] Assignee: Sun Microsystems, Inc., Palo Alto, Calif.

[21] Appl. No.: 620,490

[22] Filed: Mar. 22, 1996

[51] Int. Cl.[6] ................................................... G06F 11/00
[52] U.S. Cl. .................................. 385/183.14; 345/183.11
[58] Field of Search ........................... 395/183.14, 183.1, 395/183.11, 183.13, 704, 183.06

[56] References Cited

U.S. PATENT DOCUMENTS

| | | | |
|---|---|---|---|
| 4,802,165 | 1/1989 | Ream ................................... | 395/183.11 |
| 4,866,665 | 9/1989 | Haswell-Smith ..................... | 395/183.11 |
| 5,050,168 | 9/1991 | Paterson ............................... | 395/183.11 |
| 5,093,914 | 3/1992 | Coplien et al. ........................ | 395/700 |
| 5,142,679 | 8/1992 | Owaki et al. ........................ | 395/183.14 |
| 5,313,616 | 5/1994 | Cline et al. .......................... | 395/183.11 |
| 5,454,086 | 9/1995 | Alpert et al. ......................... | 395/183.11 |
| 5,533,192 | 7/1996 | Hawley et al. ...................... | 395/183.11 |
| 5,548,717 | 8/1996 | Wooldridge et al. ................ | 395/183.14 |
| 5,625,557 | 4/1997 | Colosky ................................... | 395/250 |
| 5,630,049 | 5/1997 | Cardoza et al. ...................... | 395/183.01 |

*Primary Examiner*—Joseph Palys
*Attorney, Agent, or Firm*—William J. Kubida; Francis A. Sirr; Holland & Hart LLP

[57] ABSTRACT

A system, method and computer program product of especial utility in allowing a user to insert a diagnostic computer program probe into an operating application computer program to either obtain a readout concerning the state of the application program or to introduce new behavior into it such that the results can be monitored. Through the provision of a number of application computer program probe points and corresponding diagnostic computer program probes herein disclosed, the invention may be utilized in conjunction with an operational application program and the corresponding diagnostic program may be developed independently of the application program the behavior of which is to be diagnosed.

28 Claims, 7 Drawing Sheets

SYSTEM AND METHOD FOR DIAGNOSING COMPUTER PROGRAM FAULTS THROUGH THE PROVISION OF PROGRAM PROBE POINTS AND REFERENCEABLE DIAGNOSTIC PROGRAM PROBES

BACKGROUND OF THE INVENTION

The present invention relates, in general, to the field of computers and computer program code. More particularly, the present invention relates to a system and method for diagnosing computer application program and system behavior through the use of diagnostic computer program probes.

Computer hardware is aspirationally designed to be compatible with a number of standard commercially available diagnostic software or "tools". The intended benefit of this hoped-for compatibility is that there should then be no need to tailor existing diagnostic tools (or design custom tools) in order to diagnose computer hardware malfunctions of newer designs.

Over and above the fact that the construction and maintenance of custom tools for every possible computer hardware line is extremely expensive, it is also undesirable from an end-user's standpoint to have an unproven analysis tool coupled into an operating production system. Unfortunately, it has heretofore often been necessary to modify existing diagnostic tools, or design new custom tools, to diagnose computer system software malfunctions. In the former instance, the modification of existing programs is generally described as "retooling" and usually results in an inadequately tested and intrusive program which must then be installed in place of the existing software at the customer site. The retooling of existing programs is usually an iterative process that must be repeated many times in order to effectuate the desired goals. In the latter instance involving the development of completely custom tools, these problems are only further magnified.

SUMMARY OF THE INVENTION

The system and method of the present invention is of especial utility in allowing a user to insert a diagnostic computer program probe into associated probe points in an operating computer program to either obtain a readout concerning the state of the operating program or to introduce new behavior such that the results can be monitored. Importantly, the diagnostic computer program probes herein disclosed may be utilized in conjunction with an operational application program and the diagnostic program may then be developed independently of the application program into which it "plugs".

Specifically disclosed herein is a method of especial utility for diagnosing computer program behavior which comprises the steps of providing at least one probe point in a first computer program and at least one probe in a second computer program for insertion within the at least one probe point. The second computer program is advised of the existence of the at least one probe point and the at least one probe is inserted into the at least one probe point.

Further disclosed herein is a system of especial utility for diagnosing a first computer program by means of an associated second computer program which comprises at least one probe point forming a portion of the first computer program, with the at least one probe point being identifiable by the second computer program. At least one probe forms a portion of the second computer program, with the at least one probe being insertable within the at least one probe point.

Still further disclosed herein is a computer program product of especial utility for effectuating diagnosis of a first computer program by a second computer program, wherein the computer program product comprises computer readable program code devices configured to cause a computer to effect providing at least one probe point in the first computer program. Computer readable program code devices are also configured to cause a computer to effect providing at least one probe in the second computer program for insertion within the at least one probe point. Further computer readable program code devices are configured to cause a computer to effect advising the second computer program of the at least one probe point; and still further computer readable program code devices are configured to cause a computer to effect inserting the at least one probe in the at least one probe point.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
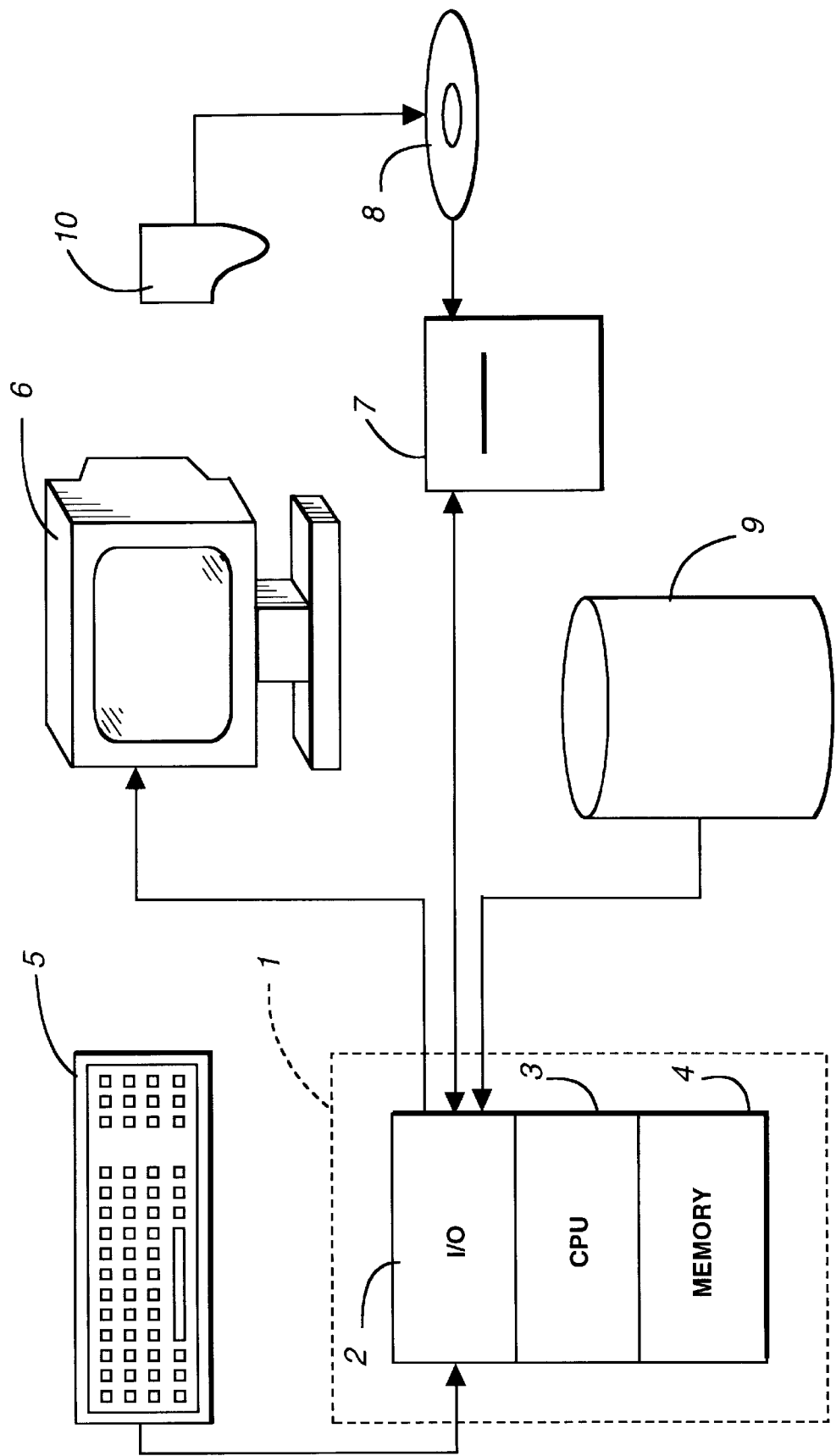
FIG. 1 is a simplified, representative block diagram of a computer comprising one exemplary portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 is connected to a keyboard 5, a display unit 6, a disk storage unit 9 and a compact disk read only memory ("CDROM") drive unit 7. The CDROM unit 7 can read a CDROM medium 8 which typically contains programs 10 and data. The computer program products containing mechanisms to effectuate the apparatus and methods of the present invention may reside in the memory section 4, or on a disk storage unit 9 or on the CDROM 8 of such a system.

Figure 2:
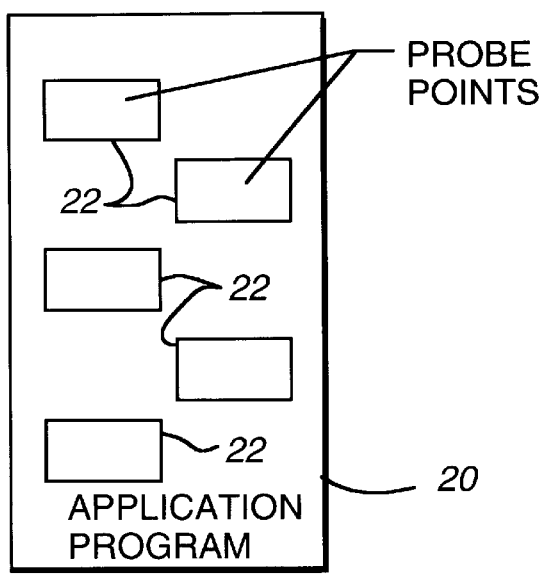
FIG. 2 is a simplified representative illustration of a computer application program having a number of probe points therein forming a portion of the system and method of the present invention.

With reference additionally now to FIG. 2, a simplified representative illustration of a computer application program 20 having a number of probe points 22 therein is shown. The computer application program 20 and probe points 22 are utilized in conjunction with the system and method of the present invention as hereinafter described in more detail.

Figure 3:
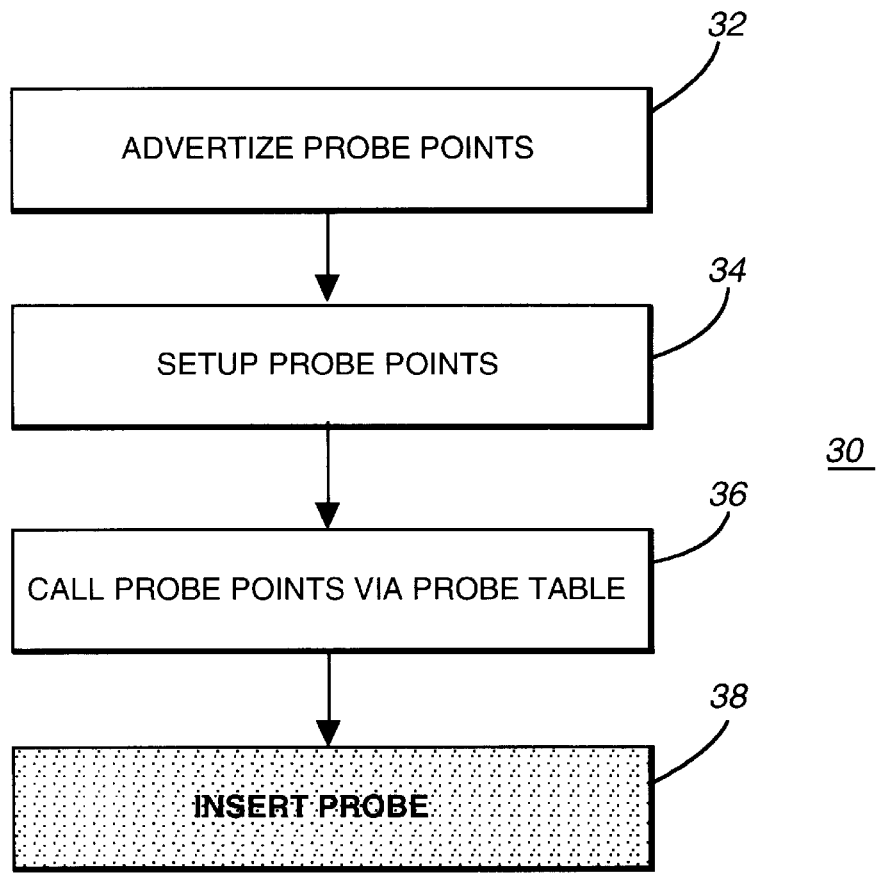
FIG. 3 is a generalized process flow for implementing the system and method of the present invention of use in conjunction with the computer application program of FIG. 2.

With reference additionally now to FIG. 3, a generalized process flow 30 for implementing the system and method of the present invention for use in conjunction with the computer application program 20 (FIG. 2) is shown. The process flow 30 comprises the steps of advertising the probe points 22 (FIG. 2) at step 32, setting up the probe points 22 at step 34 and initiating a call to the probe points via a probe table at step 36. Steps 32–36 are undertaken by the application program 20 (FIG. 2).

At step 38, a diagnostic program having a number of probes corresponding to the probe points 22 of the application program 20, has at least one of the probes inserted within a corresponding one of the probe points 22, as will be more fully described hereinafter. The shading of the block representing step 38 illustrates that this step is undertaken by the diagnostic program as opposed to the application program 20.

Figure 4A:
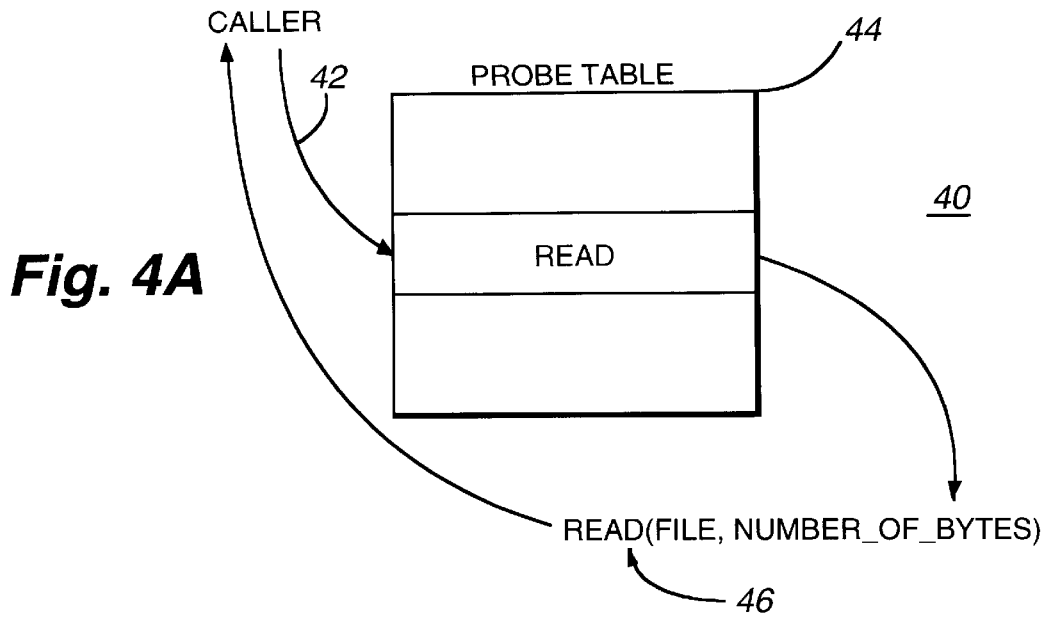
FIG. 4A illustrates the application program's use of a probe table to reference the functions which have been set up as probe points.

With reference now to FIG. 4A, an illustration of the application program 20 use of a probe table to reference the functions which have been set up as probe points 22 is shown. In this regard, the sequence 40 includes a call initiated by a caller 42 to a probe table 44. In the exemplary illustration shown, the probe table 44 references a READ function which has been set up as a probe point 46 as READ (file number_of_bytes).

Figure 4B:
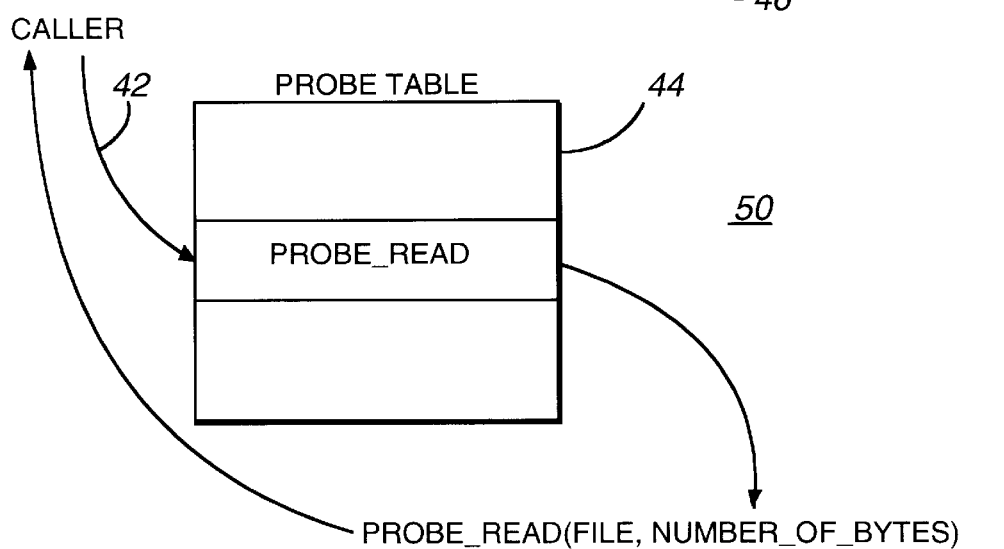
FIG. 4B illustrates how the probe tool might alter the flow through the application program by replacing the reference to the probe point with a reference to the probe in the probe table of FIG. 4A.
Figure 4B:
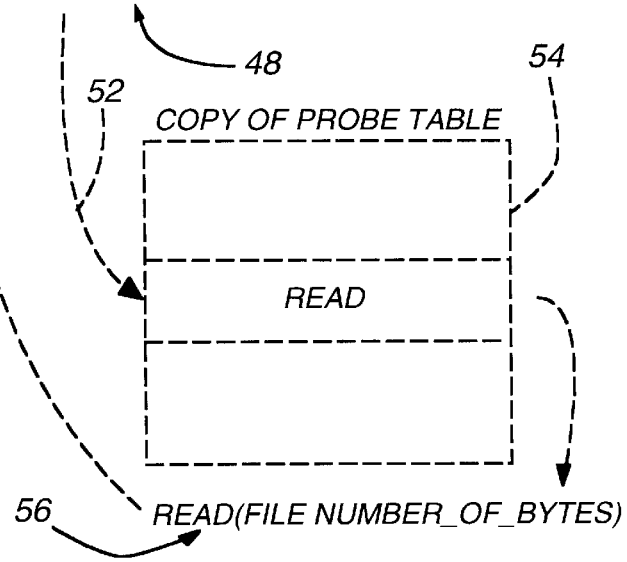

With additional reference now to FIG. 4B, a sequence 50 is shown which illustrates how a diagnostic program probe tool may alter the flow through an application program 20 (FIG. 2) by replacing the reference to a selected one of the probe points 22 with a reference to a corresponding probe in the probe table 44. In this regard, the reference in FIG. 4A to a "READ" operation is replaced by a reference to a probe point PROBE_READ (file number_of_bytes) 48 by means of a PROBE_READ operation. The PROBE_READ (file number_of_bytes) 48 then initiates a call 52 to a copy of a probe table 54 which, in turn, references the operation READ (file number_of_bytes) 56, which then refers back to the probe point 48.

Figure 5:
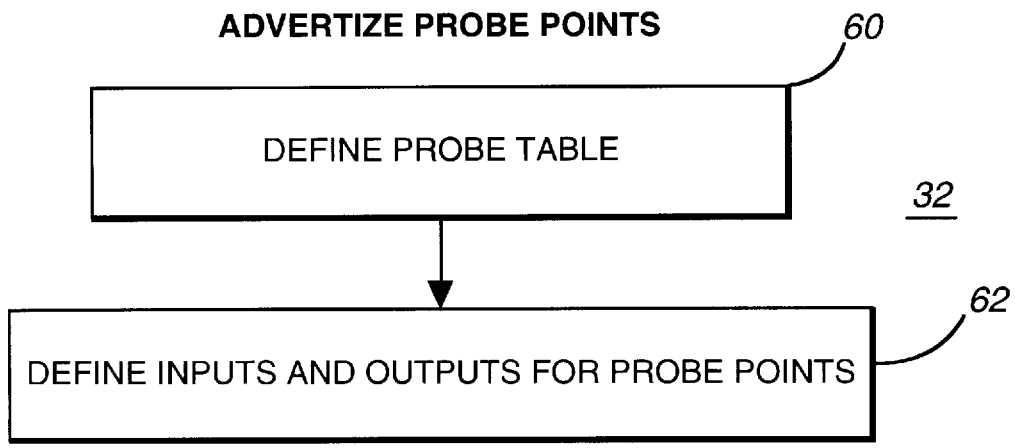
FIG. 5 is a simplified process flow corresponding to the advertizement of the probe points step of the generalized process flow illustrated in FIG. 3.

With reference additionally now to FIG. 5, a simplified process flow 32 is shown corresponding to the advertisement of probe points step previously illustrated with respect to FIG. 3. The process flow 32 comprises the steps of defining a probe table at step 60 and then defining inputs and outputs for the probe points at step 62.

Figure 6:
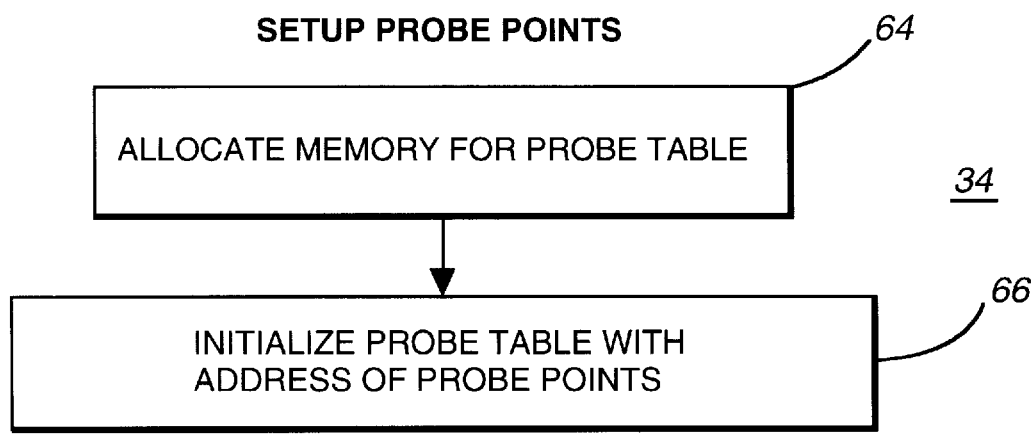
FIG. 6 is a further simplified process flow corresponding to the setup of probe points step of the generalized process flow also illustrated in FIG. 3.

With reference additionally now to FIG. 6, a representative process flow 34 for the set up of probe points as previously described with respect to FIG. 3 is shown. The simplified process flow 34 includes the steps of allocating memory for the probe table at step 64 followed by initialization of the probe table with the addresses of the probe points at step 66.

Figure 7:
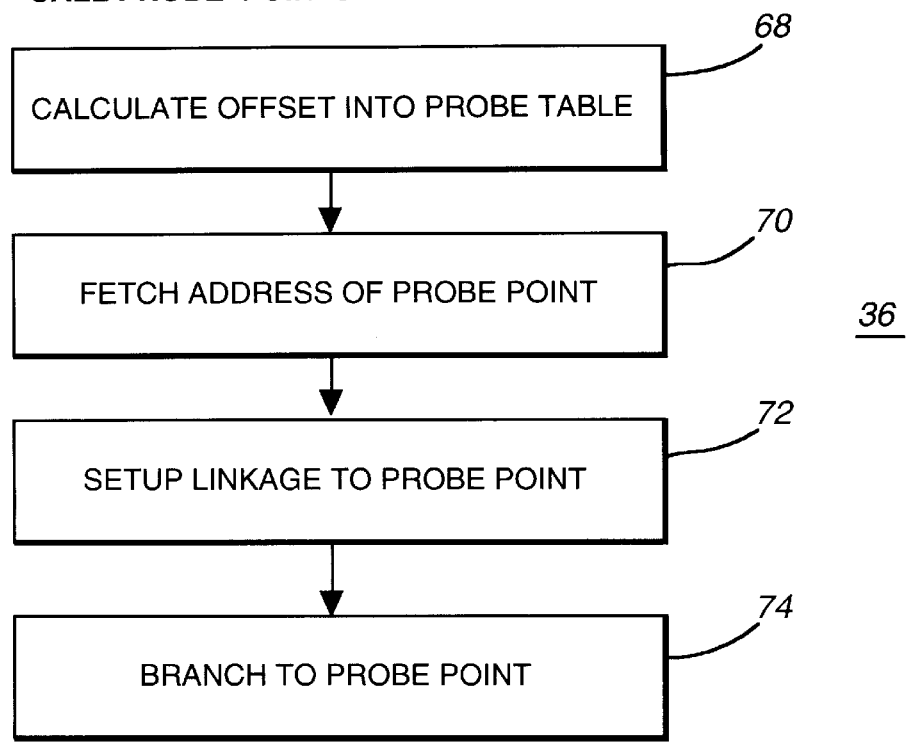
FIG. 7 is an additional simplified process flow corresponding to the call made to the probe points via the probe table step of the generalized process flow also illustrated in FIG. 3.

With reference additionally now to FIG. 7, a representative process flow 36 for the step of calling probe points via the probe table is shown. The representative process flow 36, as described previously with respect to FIG. 3, is shown to comprise the steps of calculating an offset into the probe table at step 68, fetching an address of the probe point at step 70, setting up of a linkage to the probe point at step 72 and branching to the probe point at step 74.

Figure 8:
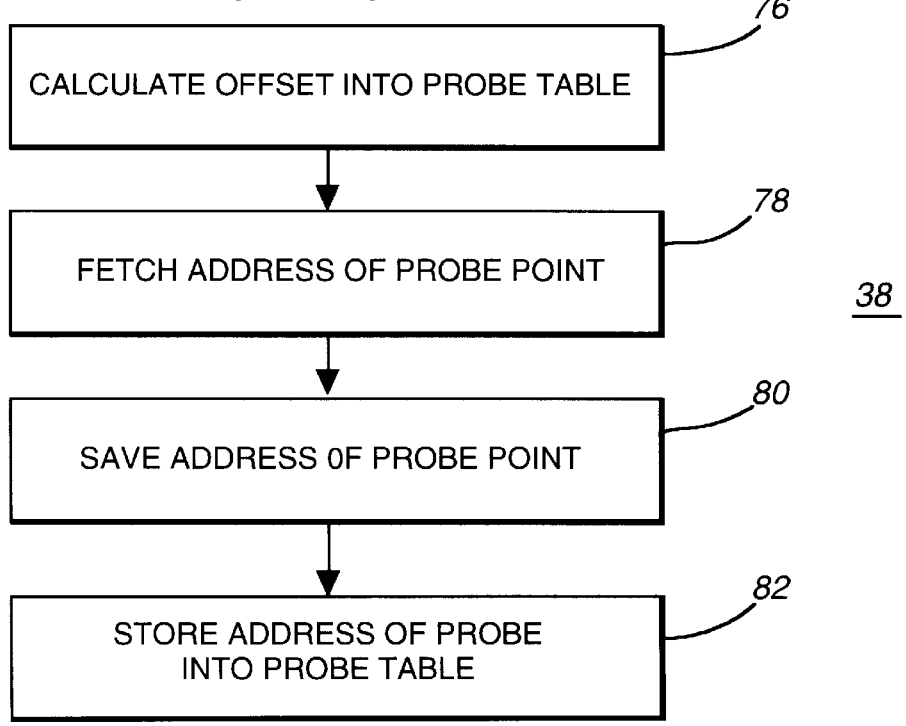
FIG. 8 is a final simplified process flow corresponding to the insert probes step of the generalized process flow illustrated in FIG. 3.

With reference additionally now to FIG. 8, a representative process flow 38 as previously described with respect to the diagnostic program in FIG. 3 is shown. The process flow 38 is initiated with the step of calculating an offset into the probe table at step 76, fetching an address of the probe point at step 78, saving an address of the probe point at step 80 and storing an address of the probe into the probe table at step 82.

Figure 9:
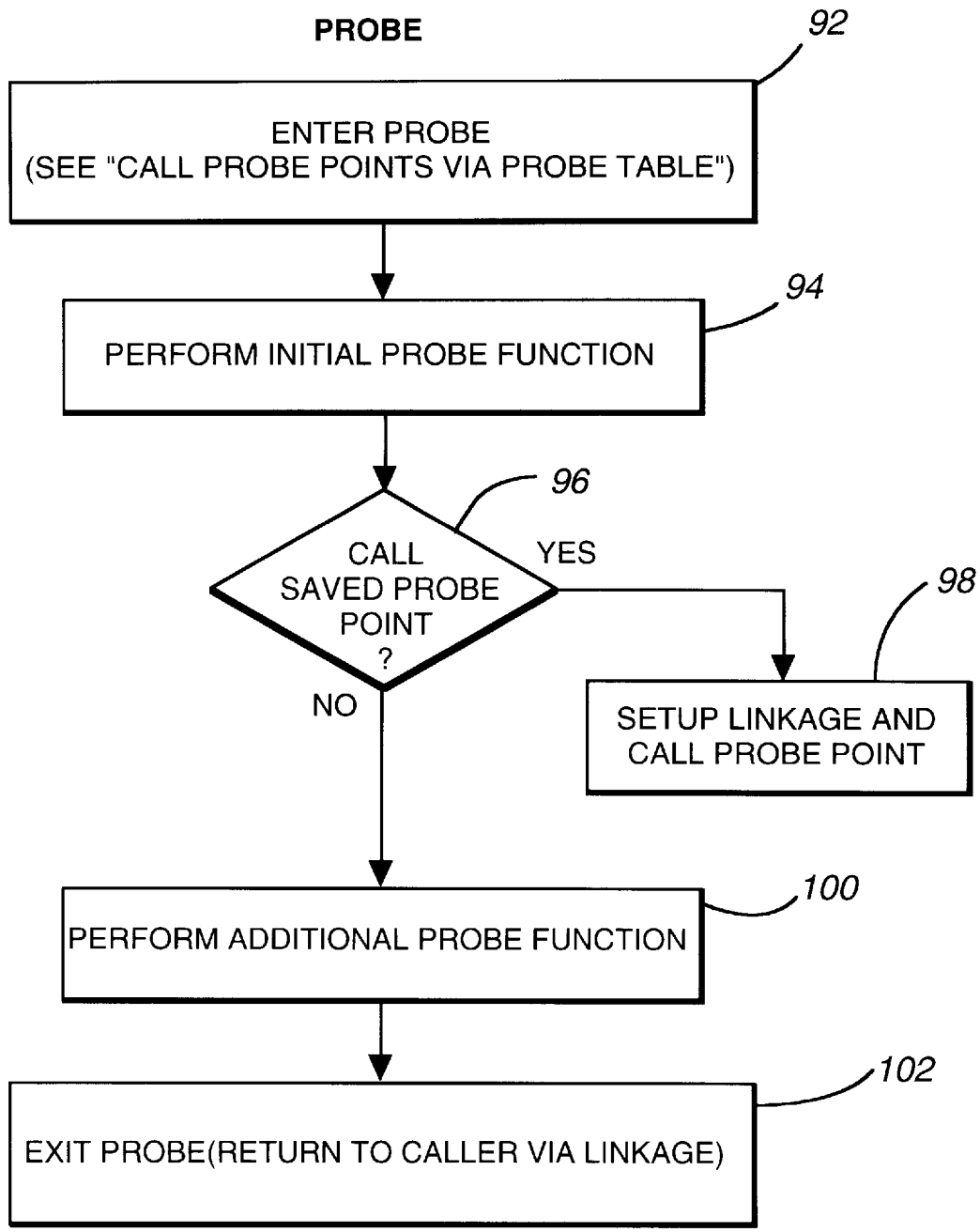
FIG. 9 is a process flow diagram depicting an exemplary probe for use in accordance with the process flow diagrams of the preceding figures.

With reference additionally now to FIG. 9, a simplified representative process flow 90 for one of the plurality of probes of the diagnostic program is shown. The process flow 90 begins at step 92 where the probe is entered into a probe point 22 of an application program 20 (FIG. 2). At step 94, the initial probe function is performed by the diagnostic program followed by decision step 96. At decision step 96, if the call saved the probe point, then the linkage is set up and the probe point is called at step 98. If the call has not saved the probe point at decision step 96, then at step 100, an additional probe function is performed followed by an exit probe step 102 which returns to the caller via the previously set up linkage.

Figure 10:
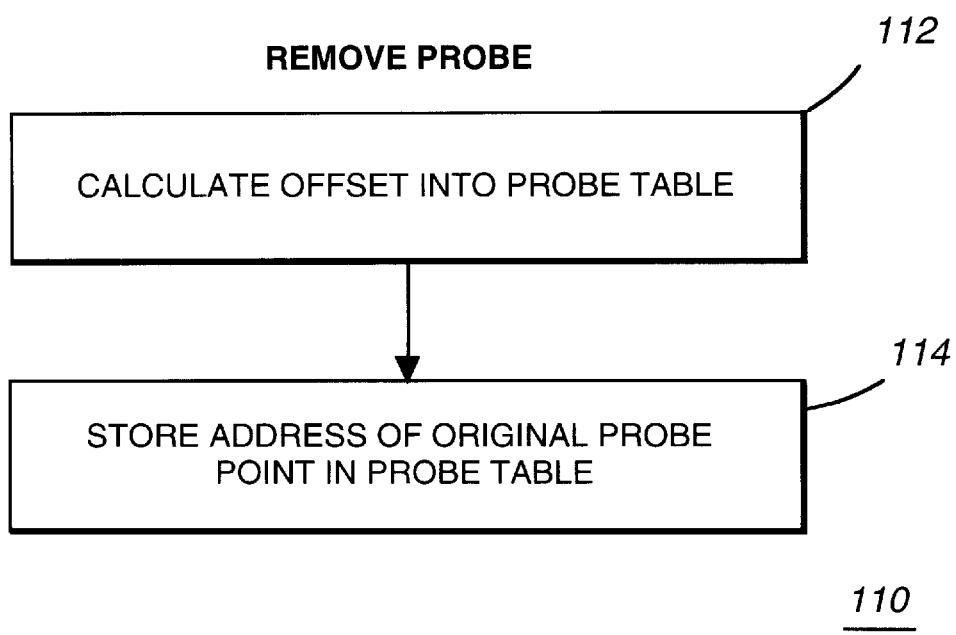
FIG. 10 is a simplified process flow diagram corresponding the removal of the probe from the application program probe point in accordance with the present invention.

With reference additionally now to FIG. 10, a representative process flow 110 for removal of a probe of a diagnostic program is shown. The process flow 110 comprises the steps of calculating an offset into the probe table at step 112 and finally storing an address of the original probe point in the probe table at step 114.

The system and method of the present invention is of especial utility in allowing a user to insert a diagnostic computer program probe into associated probe points in an operating computer program to either obtain a readout concerning the state of the operating program or to introduce new behavior such that the results can be monitored. The diagnostic computer program probes herein disclosed may be utilized in conjunction with an operational application program and the diagnostic program may then be developed independently of the application program into which it "plugs".

While there have been described above the principles of the present invention in conjunction with specific computer program code, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer implemented method for diagnosing computer program behavior comprising the steps of:
   providing at least one probe point in a first computer program;
   providing at least one probe in a second diagnosing computer program for insertion into said at least one probe point;
   providing for advising said second computer program of said at least one probe point by operation of said first computer program; and
   providing for inserting said at least one probe in said at least one probe point by operation of said second computer program and as a result of said advising step, such that operation of said first computer program is modified by said insertion of said at least one probe into said at least one probe point.

2. The method of claim 1 wherein said step of providing for advising is carried out by the steps of:
   providing for defining a probe table within said first comnputer program to reference a function of said first program that is set up as said at least one probe point; and
   providing for defining at least one input and one output for said at least one probe point.

3. The method of claim 2 wherein said step of providing for defining said probe table is carried out by the steps of:
   providing for allocating memory for said probe table; and
   providing for initializing said probe table with an address of said at least one probe point.

4. The method of claim 2 wherein said step of providing for inserting said at least one probe in said at least one probe point is carried out by the steps of:
   providing for calculating an offset into said probe table;
   providing for fetching an address of said at least one probe point;
   providing for setting up a linkage to said at least one probe point; and
   providing for branching to said at least one probe point.

5. The method of claim 2 wherein said step of providing for inserting said at least one probe in said at least one probe point is carried out by the steps of:
   providing for calculating an offset into said probe table;
   providing for fetching an address of said at least one probe point;
   providing for saving said fetched address of said at least one probe point; and
   providing for storing an address of said at least one probe into said probe table.

6. A system for diagnosing a first computer program by means of an associated second diagnostic computer program comprising:
   at least one probe point forming a portion of said first computer program, said at least one probe point being identified to said second computer program; and
   at least one probe forming a portion of said second computer program, said at least one probe being inserted within said at least one identified probe point to function as a portion of said first computer program.

7. The system of claim 6 wherein said first computer program comprises an application program.

8. The system of claim 6 having:
   a plurality of probe points forming a plurality of portions of said first computer program, said plurality of probe points being identified to said second computer program; and
   a plurality of probes forming a plurality of portions of said second computer program, said plurality of probes being inserted within said plurality of identified probe points to function as portions of said first computer program.

9. A computer program product comprising:
   computer useable medium having computer readable code embodied therein for effectuating diagnosis of a first computer program by a second diagnostic computer program;
   first computer readable program code in said medium configured to cause a computer to effect providing at least one probe point in said first computer program;
   second computer readable program code in said medium configured to cause a computer to effect providing at least one probe in said second diagnostic computer program, said at least one probe being for operation as a portion of said first computer program;
   third computer readable program code in said medium configured to cause a computer to effect advising said second diagnostic computer program of said at least one probe point; and
   fourth computer readable program code in said medium configured to cause a computer to effect inserting said at least one probe in said at least one probe point for operation as a portion of said first computer program.

10. The computer program product of claim 9 wherein said third computer readable code configured to cause a computer to effect advising comprises:
    fifth computer readable program code in said medium configured to cause a computer to effect defining a probe table; and
    sixth computer readable program code in said medium configured to cause a computer to effect defining at least one input and one output for said at least one probe point.

11. The computer program product of claim 10 wherein said fifth computer readable code configured to cause a computer to effect defining said probe table comprises:
    seventh computer readable program code in said medium configured to cause a computer to effect allocating memory for said probe table; and
    eighth computer readable program code in said medium configured to cause a computer to effect initializing said probe table with at least one address of said at least one probe point.

12. The computer program product of claim 10 wherein said fourth computer readable code configured to cause a computer to effect inserting said at least one probe in said at least one probe point comprises:
    seventh computer readable program code in said medium configured to cause a computer to effect calculating an offset into said probe table;

eighth computer readable program code in said medium configured to cause a computer to effect fetching an address of said at least one probe point;

ninth computer readable program code in said medium configured to cause a computer to effect setting up a linkage to said at least one probe point; and tenth computer readable program code in said medium configured to cause a computer to effect branching to said at least one probe point.

13. The computer program product of claim 10 wherein said fourth computer readable code configured to cause a computer to effect inserting said at least one probe in said at least one probe point comprises:

seventh computer readable program code in said medium configured to cause a computer to effect calculating an offset into said probe table;

eighth computer readable program code in said medium configured to cause a computer to effect fetching an address of said at least one probe point;

ninth computer readable program code in said medium configured to cause a computer to effect saving said fetched address of said at least one probe point; and tenth computer readable program code in said medium configured to cause a computer to effect storing an address of said at least one probe into said probe table.

14. A computer implemented method for diagnosing a first computer program having a number of probe points therein by means of a second diagnostic computer program having a corresponding number of probes therein, said method comprising the steps of:

providing for advertising at least one of said probe points to said second computer program;

providing for setting up said at least one probe point in said first computer program;

providing for issuing a call to said at least one probe point by means of a probe table; and providing for inserting at least one of said probes into said at least one probe point.

15. The method of claim 14 wherein said step of providing for advertising said at least one probe point comprises the steps of:

providing for defining said probe table; and providing for defining at least one input and one output for said at least one probe point.

16. The method of claim 14 wherein said step of providing for setting up said at least one probe point comprises the steps of:

providing for allocating memory for said probe table; and providing for initializing said probe table with at least one address of said at least one probe point.

17. The method of claim 14 wherein said step of providing for issuing a call to said at least one probe point comprises the steps of:

providing for calculating an offset into said probe table;

providing for fetching an address of said at least one probe point;

providing for setting up a linkage to said at least one probe point; and providing for branching to said at least one probe point.

18. The method of claim 14 wherein said step of providing for inserting said at least one probe into said at least one probe point comprises the steps of:

providing for calculating an offset into said probe table;

providing for fetching an address of said at least one probe point;

providing for saving said address of said at least one probe point; and providing for storing an address of said at least one probe into said probe table.

19. A computer program product having a computer useable medium with computer readable code embodied therein for effectuating diagnosis of a first computer program having a number of probe points therein by means of a second diagnostic computer program having a corresponding number of probes therein, said computer program product comprising:

first computer readable program code in said medium configured to cause a computer to effect advertising at least one probe point to said second computer program;

second computer readable program code in said medium configured to effect setting up said at least one probe point in said first computer program;

third computer readable program code in said medium configured to cause a computer to effect issuing a call to said at least one probe point by means of a probe table; and fourth computer readable program code in said medium configured to cause a computer to effect inserting at least one of said probes into said at least one probe point.

20. The computer program product of claim 19 wherein said first computer readable program code configured to cause a computer to effect advertising at least one probe point to said second computer program comprises:

fifth computer readable program code in said medium configured to cause a computer to effect defining a probe table; and sixth computer readable program code in said medium configured to cause a computer to effect defining at least one input and one output for said at least one probe point.

21. The computer program product of claim 19 wherein said second computer readable program code configured to cause a computer to effect defining setting up said at least one probe point in said first computer program comprises:

fifth computer readable program code in said medium configured to cause a computer to effect allocating memory for said probe table; and sixth computer readable program code in said medium configured to cause a computer to effect initializing said probe table with at least one address of said at least one probe point.

22. The computer program product of claim 19 wherein said third computer readable program code configured to cause a computer to effect issuing a call to said at least one probe point by means of a probe table comprises:

fifth computer readable program code in said medium configured to cause a computer to effect calculating an offset into said probe table;

sixth computer readable program code in said medium configured to cause a computer to effect fetching an address of said at least one probe point;

seventh computer readable program code in said medium configured to cause a computer to effect setting up a linkage to said at least one probe point; and eighth computer readable program code in said medium configured to cause a computer to effect branching to said at least one probe point.

23. The computer program product of claim 19 wherein said fourth computer readable program code configured to cause a computer to effect inserting said at least one probe into said at least one probe point comprises:

fifth computer readable program code in said medium configured to cause a computer to effect calculating an offset into said probe table;

sixth computer readable program code in said medium configured to cause a computer to effect fetching an address of said at least one probe point;

seventh computer readable program code in said medium configured to cause a computer to effect saving said fetched address of said at least one probe point; and eighth computer readable program code in said medium configured to cause a computer to effect storing an address of said at least one probe into said probe table.

24. A computer implemented method for diagnosing computer behavior comprising the steps of:

providing at least one probe point in a first computer program;

providing at least one probe in a second diagnosing computer program for insertion into said at least one probe point;

advising said second computer program of said at least one probe point by operation of said first computer program; and inserting said at least one probe in said at least one probe point by operation of said second computer program and as a result of said advising step, such that operation of said first computer program is modified by said insertion of said at least one probe into said at least one probe point.

25. The method of claim 24 wherein said step of advising is carried out by the steps of:

defining a probe table within said first computer program to reference a function of said first program that is set up as said at least one probe point; and defining at least one input and one output for said at least one probe point.

26. The method of claim 25 wherein said step of defining said probe table is carried out by the steps of:

allocating memory for said probe table; and initializing said probe table with an address of said at least one probe point.

27. The method of claim 25 wherein said step of inserting said at least one probe in said at least one probe point is carried out by the steps of:

calculating an offset into said probe table;

fetching an address of said at least one probe point;

setting up a linkage to said at least one probe point; and branching to said at least one probe point.

28. The method of claim 25 wherein said step of inserting said at least one probe in said at least one probe point is carried out by the steps of:

calculating an offset into said probe table;

fetching an address of said at least one probe point;

saving said fetched address of said at least one probe point; and storing an address of said at least one probe point into said probe table.

* * * * *